United States Patent
Kurata

(10) Patent No.: US 11,999,333 B2
(45) Date of Patent: Jun. 4, 2024

(54) DRIVING SUPPORT DEVICE, DRIVING SUPPORT METHOD, AND STORAGE MEDIUM

(71) Applicant: HONDA MOTOR CO., LTD., Tokyo (JP)

(72) Inventor: Yasuhiro Kurata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 235 days.

(21) Appl. No.: 17/679,151

(22) Filed: Feb. 24, 2022

(65) Prior Publication Data

US 2022/0314941 A1 Oct. 6, 2022

(30) Foreign Application Priority Data

Mar. 30, 2021 (JP) .................................. 2021-057739

(51) Int. Cl.
*B60T 7/22* (2006.01)
*B60T 8/172* (2006.01)
*B60T 8/72* (2006.01)

(52) U.S. Cl.
CPC ................ *B60T 7/22* (2013.01); *B60T 8/172* (2013.01); *B60T 8/72* (2013.01); *B60T 2201/02* (2013.01)

(58) Field of Classification Search
CPC ............... B60T 7/22; B60T 8/177; B60T 8/72
See application file for complete search history.

(56) References Cited

U.S. PATENT DOCUMENTS

| | | | |
|---|---|---|---|
| 5,607,209 A | 3/1997 | Narita et al. | |
| 7,382,274 B1* | 6/2008 | Kermani | G08G 1/096775 340/901 |
| 8,538,674 B2* | 9/2013 | Breuer | B60W 30/1884 340/436 |
| 2002/0026272 A1* | 2/2002 | Yamamoto | B60T 13/662 701/70 |
| 2002/0101337 A1* | 8/2002 | Igaki | B60K 28/066 340/436 |

(Continued)

FOREIGN PATENT DOCUMENTS

| | | |
|---|---|---|
| DE | 102016112839 | 1/2017 |
| JP | 10-305767 | 11/1998 |

(Continued)

OTHER PUBLICATIONS

Japanese Office Action for Japanese Patent Application No. 2021-057739 dated Dec. 6, 2022.

*Primary Examiner* — Long T Tran
(74) *Attorney, Agent, or Firm* — Amin, Turocy & Watson, LLP

(57) ABSTRACT

A driving support device includes a braking controller configured to execute braking control, a first calculator configured to calculate a first braking control amount of the braking controller, a second calculator configured to calculate, on the basis of a setting standard, a second braking control amount of the braking control executed at an execution frequency lower than an execution frequency of the braking control based on the first braking control amount, and an updater configured to update the setting standard on the basis of a relative relationship between an estimated braking behavior based on the first braking control amount and an actual braking behavior based on the first braking control amount.

6 Claims, 4 Drawing Sheets

(56) References Cited

U.S. PATENT DOCUMENTS

| | | | |
|---|---|---|---|
| 2015/0367822 A1 | 12/2015 | Jennek et al. | |
| 2017/0015203 A1 | 1/2017 | Oguri | |
| 2020/0361428 A1* | 11/2020 | Blumentritt | B60T 17/221 |
| 2021/0179123 A1* | 6/2021 | Yamada | B60T 7/12 |
| 2022/0041146 A1* | 2/2022 | Tschanz | B60T 8/172 |
| 2022/0203980 A1* | 6/2022 | Namba | B60W 30/18163 |
| 2022/0219684 A1* | 7/2022 | Shimizu | B60W 30/085 |

FOREIGN PATENT DOCUMENTS

| | | |
|---|---|---|
| JP | 3036398 | 4/2000 |
| JP | 2000-289593 | 10/2000 |
| JP | 2002-127783 | 5/2002 |
| JP | 2002-240591 | 8/2002 |

* cited by examiner

FIG. 2

EMERGENCY BRAKING MAP 152

|  | $0.5 m/S^2$ | $0.6 m/S^2$ | $0.7 m/S^2$ |
|---|---|---|---|
| 60km/h | A-1 | A-2 | A-3 |
| 50km/h | B-1 | B-2 | B-3 |
| 40km/h | C-1 | C-2 | C-3 |

FIG. 4

EMERGENCY BRAKING MAP 152 (AFTER CHANGE)

|  | $0.5 m/S^2$ | $0.6 m/S^2$ | $0.7 m/S^2$ |
|---|---|---|---|
| 60km/h | A-2 | A-3 | A-4 |
| 50km/h | B-2 | B-3 | B-4 |
| 40km/h | C-2 | C-3 | C-4 |

DRIVING SUPPORT DEVICE, DRIVING SUPPORT METHOD, AND STORAGE MEDIUM

CROSS-REFERENCE TO RELATED APPLICATION

This application is based upon and claims the benefit of priority from Japanese Patent Application No. 2021-057739, filed Mar. 30, 2021, the entire contents of which is incorporated herein by reference.

BACKGROUND

Field of the Invention

The present invention relates to a driving support device, a driving support method, and a storage medium.

Description of Related Art

In controlling the braking of a vehicle, there is a technology of calculating a target deceleration, decelerating the vehicle by performing feedforward control, and adjusting an inter-vehicle distance from a preceding vehicle (for example, refer to Japanese Unexamined Patent Application, First Publication No. 2002-127738).

SUMMARY

As a technology of controlling the braking of a vehicle, in addition to the control for adjusting the inter-vehicle distance, for example, there is a technology of urgently braking a vehicle. The technology of urgently braking a vehicle was only executed in emergencies and thus had a low execution frequency. For this reason, even if a braking device deteriorates, for example, brake pads are worn out and braking performance decreases, there is a problem that the technology of urgently braking a vehicle may not enable control according to a decrease in the braking performance.

The present invention has been made in consideration of such circumstances, and an object thereof is to provide a driving support device, a driving support method, and a storage medium that can appropriately control braking even when braking performance has decreased.

The driving support device, the driving support method, and the storage medium according to the present invention has adopted the following configuration.

(1) According to a first aspect of the present invention, a driving support device includes a braking controller configured to execute braking control, a first calculator configured to calculate a first braking control amount of the braking controller, a second calculator configured to calculate, on the basis of a setting standard, a second braking control amount of the braking control executed at an execution frequency lower than an execution frequency of the braking control based on the first braking control amount, and an updater configured to update the setting standard on the basis of a relative relationship between an estimated braking behavior based on the first braking control amount and an actual braking behavior based on the first braking control amount.

(2) According to a second aspect of the present invention, in the aspect of (1) described above, the first calculator calculates the first braking control amount when vehicle speed control according to a set vehicle speed is executed, and the second calculator calculates the second braking control amount when emergency braking control is executed.

(3) According to a third aspect of the present invention, in the aspect of (2) described above, the setting standard is a braking map that includes a braking control amount according to a vehicle speed and a deceleration when the emergency braking control is executed.

(4) According to a fourth aspect of the present invention, in the aspect of any one of (1) to (3) described above, the updater updates the setting standard on the basis of a plurality of relative relationships between the estimated braking behavior and the actual braking behavior.

(5) According to a fifth aspect of the present invention, in the aspect of (4) described above, when target data is data whose difference from other data exceeds a predetermined threshold value among data of the plurality of relative relationships, the target data is excluded from the data of the plurality of relative relationships.

(6) According to a sixth aspect of the present invention, a driving support method includes, by a computer, calculating a first braking control amount of braking control, calculating, on the basis of a setting standard, a second braking control amount of the braking control executed at an execution frequency lower than an execution frequency of the braking control based on the first braking control amount, updating the setting standard on the basis of a relative relationship between an estimated braking behavior based on the first braking control amount and an actual braking behavior based on the first braking control amount, and executing the braking control.

(7) According to a seventh aspect of the present invention, a computer-readable non-transitory storage medium has stored a program causing a computer to execute calculating a first braking control amount of braking control, calculating, on the basis of a setting standard, a second braking control amount of the braking control executed at an execution frequency lower than an execution frequency of the braking control based on the first braking control amount, updating the setting standard on the basis of a relative relationship between an estimated braking behavior based on the first braking control amount and an actual braking behavior based on the first braking control amount, and executing the braking control.

According to the above aspect, even if the braking performance has deteriorated, it is possible to appropriately control braking.

BRIEF DESCRIPTION OF THE DRAWINGS

FIG. 2 is a diagram which shows an example of contents of an emergency braking map.

FIG. 4 is a diagram which shows an example of contents of an updated emergency braking map.

DESCRIPTION OF EMBODIMENTS

In the following description, an embodiment of a driving support device, a driving support method, and a storage medium of the present invention will be described with reference to the drawings.

Figure 1:
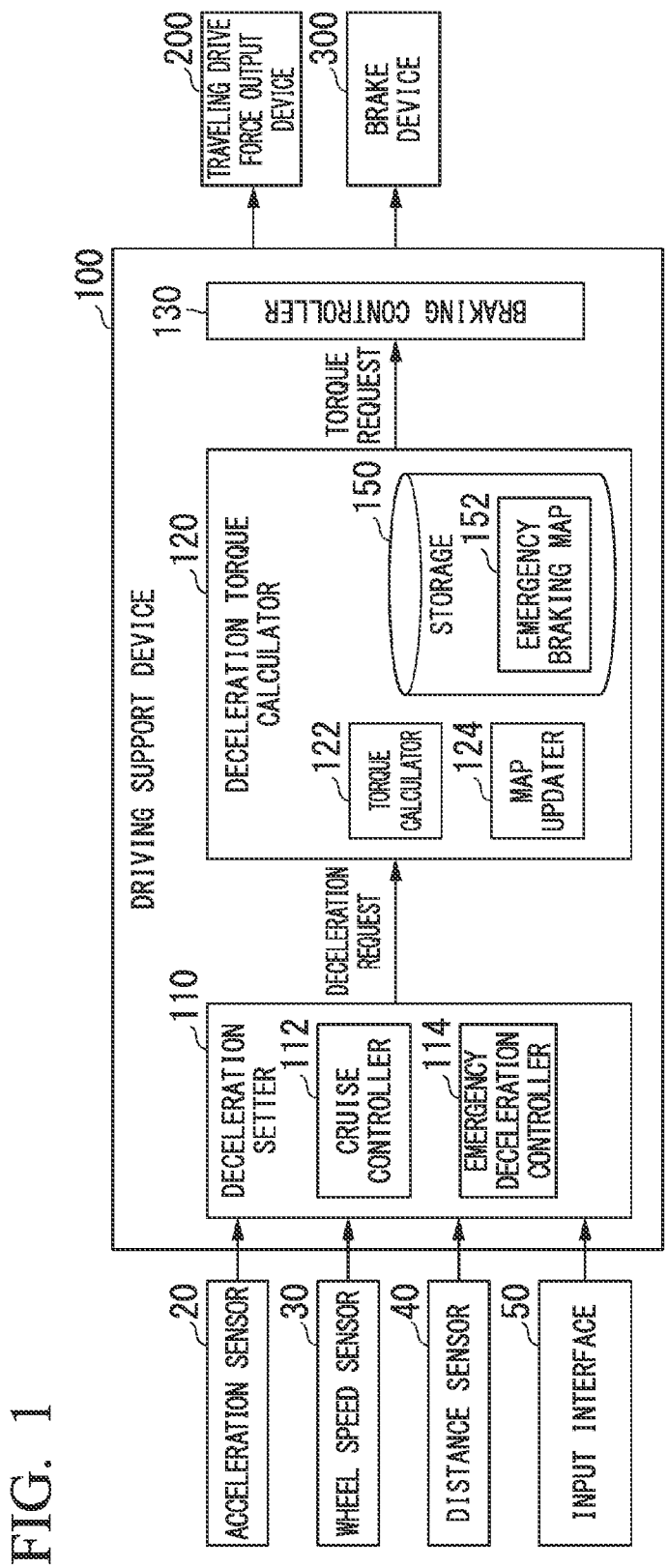
FIG. 1 is a configuration diagram of a driving support device according to an embodiment.

FIG. 1 is a configuration diagram of a driving support device 100 according to an embodiment. The vehicle in which the driving support device 100 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates by using electric power generated by a generator connected to the internal combustion engine or discharged electric power of secondary batteries or fuel cells.

The driving support device 100 can execute emergency braking control such as cruise control (Adaptive Cruise Control: ACC) and a collision mitigation braking system (CMBS) as braking control for a vehicle. Cruise control is, for example, control for traveling by following a preceding vehicle traveling in front of a vehicle. In the cruise control, feedback control that sets a set vehicle speed on the basis of an inter-vehicle distance between a vehicle and a preceding vehicle is used to accelerate or decelerate the vehicle so that the vehicle travels at the set vehicle speed, and to control a traveling drive force control device or a brake device to maintain the inter-vehicle distance. When there is no preceding vehicle, in the cruise control, the vehicle is accelerated or decelerated such that the vehicle travels at a preset vehicle speed. The cruise control is an example of vehicle speed control according to a set vehicle speed.

Emergency braking control is, for example, a control for a traveling vehicle to avoid a collision with an obstacle such as a pedestrian. In the emergency braking control, for example, in feedforward control such as setting a collision allowance time (Time To Collision; TTC) from a start of a collision avoidance operation to a collision of a vehicle with an obstacle, a brake device is controlled or a steering angle of a steering wheel is controlled to prevent the vehicle from colliding with the obstacle.

The driving support device 100 can input or output, for example, an electric signal between an acceleration sensor 20, a wheel speed sensor 30, a distance sensor 40, an input interface 50, a traveling drive force output device 200, and a brake device 300. The acceleration sensor 20 detects an acceleration of a vehicle. The acceleration sensor 20 outputs an electric signal indicating the detected acceleration to the driving support device 100.

The wheel speed sensor 30 detects a wheel speed of vehicle wheels mounted in the vehicle. The wheel speed sensor 30 outputs an electric signal indicating the detected wheel speed to the driving support device 100. The distance sensor 40 detects an object around the vehicle, for example, the inter-vehicle distance between a preceding vehicle traveling in front of the vehicle and the vehicle. The distance sensor 40 outputs an electric signal indicating the detected inter-vehicle distance to the driving support device 100.

The input interface 50 is provided, for example, at a position within a reach of an occupant. The input interface 50 can be operated by the occupant. The input interface 50 outputs to the driving support device 100 an electric signal indicating information according to an operation of the occupant, for example, information on whether to execute the cruise control, and information on a set vehicle speed when the cruise control is executed.

The driving support device 100 includes, for example, a deceleration setter 110, a deceleration torque calculator 120, a braking controller 130, and a storage 150. The deceleration setter 110, the deceleration torque calculator 120, and the braking controller 130 are realized by, for example, a hardware processor such as a central processing unit (CPU) executing a program (software). In addition, some or all of these components can be realized by hardware (circuit units; including circuitry) such as large scale integration (LSI), an application specific integrated circuit (ASIC), a field-programmable gate array (FPGA), and a graphics processing unit (GPU), and may also be realized by software and hardware in cooperation. The program may be stored in advance in a storage device (a storage device having a non-transitory storage medium) such as an HDD or a flash memory of the driving support device 100, or may be stored in a removable storage device such as a DVD or a CD-ROM and installed in the HDD or flash memory of the driving support device 100 by a storage medium (non-transitory storage medium) being mounted in a drive device. The storage 150 is realized by the storage device described above.

The storage 150 stores, for example, an emergency braking map 152. FIG. 2 is a diagram which shows an example of contents of the emergency braking map 152. The emergency braking map 152 is a map used for emergency braking control. The emergency braking map 152 includes a requested torque to be output to the brake device 300, which is determined according to a vehicle speed and a deceleration when emergency braking control is executed. In other words, the emergency braking map 152 is information in which a torque requested to be output to the brake device 300 is associated with the vehicle speed and the deceleration when the emergency braking control is executed.

Requested torques stored in the emergency braking map 152 are, for example, set in order of "A," "B," and "C" for each vehicle speed, and are getting larger by one step in order of "1," "2," "3" assigned as a branch number. For this reason, among the requested torques shown in FIG. 2, a requested torque indicated by "A-1" is the largest, and a requested torque indicated by "C-3" is the smallest. The storage 150 also stores a cruise control braking map (not shown). The cruise control braking map is a map that includes requested torques according to a plurality of types of vehicle speeds and decelerations when the cruise control is executed. In other words, the cruise control braking map includes a plurality of maps, and torques requested to be output to the brake device 300 are associated with the vehicle speeds and decelerations in each of the maps.

The deceleration setter 110 sets the deceleration when the braking of the vehicle is controlled. The deceleration setter 110 includes, for example, a cruise controller 112 and an emergency deceleration controller 114. When the input interface 50 outputs an electric signal indicating the information for executing the cruise control, the cruise controller 112 sets the deceleration when the cruise control is executed.

The cruise controller 112 sets the deceleration of the vehicle when braking control (hereinafter referred to as cruise braking control) in the cruise control is performed on the basis of, for example, the inter-vehicle distance based on the electric signal output by the distance sensor 40 and a corresponding time change. The cruise controller 112 generates a deceleration request according to the set deceleration, and outputs the generated deceleration request (hereinafter referred to as a first deceleration request) to the deceleration torque calculator 120. The driving support device 100 calculates the acceleration of the vehicle when drive control in the cruise control is performed, and outputs an acceleration request according to the calculated acceleration to the traveling drive force output device 200.

The emergency deceleration controller 114 sets the deceleration of the vehicle at the time of emergency braking. The emergency deceleration controller 114 sets the deceleration on the basis of the acceleration, a vehicle speed, and the like based on the electric signals output by the acceleration sensor 20 and the wheel speed sensor 30, respectively. The emergency deceleration controller 114 generates a deceleration request according to the set deceleration, and outputs the generated deceleration request (hereinafter referred to as a second deceleration request) to the deceleration torque calculator 120.

Emergency braking control according to a second deceleration request is executed at the time of an emergency such as collision avoidance. On the other hand, cruise braking control according to a first deceleration request is executed at a normal time such as traveling by following a preceding vehicle. For this reason, the emergency braking control according to the second deceleration request is braking control that is executed less frequently than the cruise braking control according to the first deceleration request.

The deceleration torque calculator 120 calculates a deceleration torque according to a deceleration request output by the deceleration setter 110. The deceleration torque calculator 120 includes, for example, a torque calculator 122 and a map updater 124. The torque calculator 122 generates a torque request for the braking controller 130 on the basis of the deceleration request output by the deceleration setter 110.

When a first deceleration request is output by the cruise controller 112 of the deceleration setter 110, the torque calculator 122 calculates a requested torque according to the first deceleration request by referring to the cruise control braking map. When a second deceleration request is output by the emergency deceleration controller 114 of the deceleration setter 110, the torque calculator 122 calculates a requested torque by referring to a vehicle speed based on the output second deceleration request and an electric signal output by the wheel speed sensor 30, and the emergency braking map 152 shown in FIG. 2. The emergency braking map 152 is an example of a braking map and a setting standard.

The torque calculator 122 calculates a second braking control amount of the emergency braking control that is executed at a lower execution frequency than an execution frequency of the cruise braking control based on a first braking control amount. A deceleration torque according to a deceleration request output by the cruise controller 112 is a deceleration torque when the cruise control is executed. A deceleration torque according to a deceleration request output by the emergency deceleration controller 114 is a deceleration torque when the emergency braking control is executed.

The torque calculator 122 generates a torque request according to the calculated requested torque, and outputs the generated torque request to the braking controller 130. A requested torque according to the first deceleration request is an example of the first braking control amount. A requested torque according to the second deceleration request is an example of the second braking control amount. The cruise controller 112 and the torque calculator 122 are examples of a first calculator. The emergency deceleration controller 114 and the torque calculator 122 are examples of the second calculator. The torque calculator 122 may include a first torque calculator that calculates a requested torque according to the first deceleration request, and a second torque calculator that calculates a requested torque according to the second deceleration request.

When the torque calculator 122 outputs a torque request according to the requested torque based on the first deceleration request, the map updater 124 calculates estimation values of the vehicle speed and the deceleration of the vehicle (hereinafter referred to as a vehicle speed estimation value and a deceleration estimation value, respectively) according to the torque request. The map updater 124 acquires the vehicle speed and the deceleration of the vehicle (hereinafter referred to as a vehicle speed measurement value and a deceleration measurement value, respectively) based on electric signals output by the acceleration sensor 20 and the wheel speed sensor 30. The estimation values of the vehicle speed and the deceleration of the vehicle according to the torque request based on the first deceleration request are examples of the estimated braking behavior based on the first braking control amount. The vehicle speed and the deceleration of the vehicle according to the torque request based on the first deceleration request are examples of the actual braking behavior based on the first braking control amount.

The map updater 124 compares the calculated vehicle speed estimation value and deceleration estimation value with the acquired vehicle speed measurement value and deceleration measurement value. The map updater 124 estimates a value obtained by comparing the vehicle speed estimation value with the vehicle speed measurement value (hereinafter referred to as a true vehicle speed value) and a value obtained by comparing the deceleration estimation value with the deceleration measurement value (hereinafter referred to as a true deceleration value). The map updater 124 stores data of the estimated true vehicle speed value and true deceleration value in the storage 150. Data of a large number of true vehicle speed values and true deceleration values (hereinafter collectively referred to as true values) are stored in the storage 150. The true value is an example of a relative relationship between the estimated braking behavior and the actual braking behavior. The relative relationship may be a relationship other than the true value. For example, the relative relationship may be a relationship between an estimation value and an actual measurement value.

The map updater 124 verifies (determines) certainty of the estimated true values, and confirms the true values when the true values are certain. The map updater 124 updates (changes) the emergency braking map 152 when the true values are not certain. The map updater 124 updates the emergency braking map 152 on the basis of, for example, the estimated true values, and a plurality of true values stored in the storage 150. The map updater 124 is an example of an updater.

For example, when a change rate of the estimated true vehicle speed value and true deceleration value with respect to a change rate of a measurement time change in a plurality of accumulated true vehicle speed values and true deceleration values is equal to or less than each set reference value, the map updater 124 determines that the estimated true values are certain. The map updater 124 determines that the true values are not certain when the change rate of the estimated true vehicle speed value and true deceleration value with respect to the change rate of a measurement time change for one or both accumulated true vehicle speed values and true deceleration values exceeds the reference value. A reference for determining whether the true value is certain may be a reference other than this.

When a difference between the data of a true vehicle speed value and a true deceleration value obtained by comparing an estimation value and a measurement value and other data among data of a plurality of true vehicle speed values and true deceleration values exceeds a predetermined threshold value, the map updater 124 excludes the data from the data of a plurality of true vehicle speed values and true deceleration values. The data of a true vehicle speed value and a true deceleration value obtained by comparing the estimation value and the measurement value is an example of a target data.

The predetermined threshold value can be set arbitrarily. For example, the data of true values obtained when the vehicle travels on a road surface with a low frictional force, such as when it is heavy rain or when the vehicle travels on a snowy road, is often far from data of true values obtained when the vehicle travels on a normal road surface. For this reason, for example, the threshold value may be set to a size that excludes the data of true values when the vehicle travels on a road surface with a low frictional force.

The braking controller 130 outputs a control request to the brake device 300 on the basis of the torque request output by the deceleration torque calculator 120. The control request is, for example, a hydraulic pressure (hydraulic pressure) request when the brake device 300 includes a hydraulic brake. The control request is, for example, a current request when the brake device 300 includes an electric brake.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic control unit (ECU) that controls these. The ECU operates according to an acceleration request output by the driving support device 100 or information transmitted on the basis of an operation of a driving operator such as an accelerator pedal or a brake pedal, and drives the vehicle.

The brake device 300 includes, for example, a brake caliper, a cylinder that transmits a hydraulic pressure to the brake caliper, an electric motor that generates a hydraulic pressure in the cylinder, and a brake ECU. The brake ECU operates according to a control request output by the braking controller 130 or the information transmitted on the basis of the operation of the driving operator described above to brake the vehicle. The brake device 300 is operated by, for example, cruise braking control based on the first deceleration request and emergency braking control based on the second deceleration request to brake the vehicle.

Figure 3:
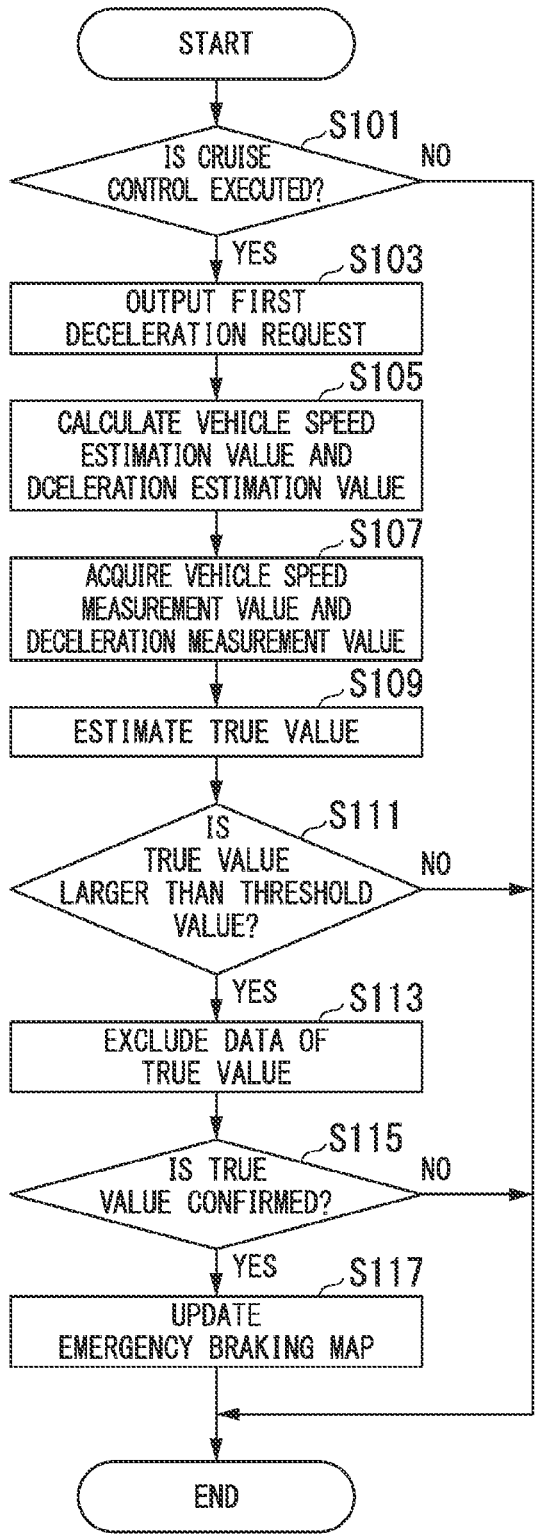
FIG. 3 is a flowchart which shows an example of processing in the driving support device.

Next, processing in the driving support device 100 will be described. FIG. 3 is a flowchart which shows an example of the processing in the driving support device 100. Here, a procedure in which the driving support device 100 updates the emergency braking map 152 will be described. First, the driving support device 100 determines whether to execute cruise control on the basis of an electric signal output by the input interface 50 (step S101). When it is determined that the cruise control will not be executed, the driving support device 100 ends the processing shown in FIG. 3.

When the driving support device 100 determines that the cruise control will be executed, the cruise controller 112 sets a requested deceleration on the basis of the inter-vehicle distance between the vehicle and the preceding vehicle based on the electric signal output by the distance sensor 40 and the corresponding time change. The cruise controller 112 outputs the first deceleration request corresponding to the set deceleration request to the deceleration torque calculator 120 (step S103).

Subsequently, the deceleration torque calculator 120 calculates a requested torque based on the requested deceleration output by the cruise controller 112 and the electric signal output by the acceleration sensor 20. The driving support device 100 executes the cruise control of the vehicle by the cruise controller 112 transmitting the calculated requested torque to the braking controller 130.

When the driving support device 100 is executing the cruise control, the deceleration torque calculator 120 calculates a vehicle speed estimation value and a deceleration estimation value of the vehicle by executing the cruise control in the map updater 124 (step S105). The map updater 124 calculates, for example, the vehicle speed estimation value and the deceleration estimation value of the vehicle according to the torque request based on the first deceleration request output by the cruise controller 112.

Subsequently, the map updater 124 acquires a vehicle speed measurement value and a deceleration measurement value of the vehicle based on the electric signals output by the acceleration sensor 20 and the wheel speed sensor 30, respectively (step S107). Subsequently, the map updater 124 compares the vehicle speed estimation value and the deceleration estimation value with the vehicle speed measurement value and the deceleration measurement value, respectively, and estimates the true vehicle speed value and the true deceleration value (step S109).

Subsequently, the map updater 124 determines whether the estimated true vehicle speed value or true deceleration value exceeds a threshold value (step S111). When it is determined that any one of the true vehicle speed value and the true deceleration value exceeds the threshold value, the map updater 124 excludes data of the estimated true value from the data stored in the storage 150 (step S113). By excluding the data of the true value in which one of the true vehicle speed value and the true deceleration value exceeds the threshold value, it is possible to exclude, for example, data such as that obtained when traveling on a road surface having a low frictional force.

Subsequently, the map updater 124 stores the data of the true value in the storage 150 when it is determined that neither the true vehicle speed value nor the true deceleration value exceeds the threshold value. Subsequently, the map updater 124 determines whether to confirm the estimated true value (step S115). The map updater 124 determines whether the true value is confirmed on the basis of whether the estimated true value is certain, confirms the true value when the estimated true value is certain, and does not confirm the true value when the estimated true value is not certain.

When the map updater 124 determines that the estimated true value is not confirmed, the driving support device 100 ends the processing shown in FIG. 3. When it is determined that the estimated true value is confirmed, the map updater 124 updates the emergency braking map 152 (step S117). In this case, the map updater 124 updates the requested torque to be larger by one step at a stage of the branch number, for example, as compared with the emergency braking map 152 before the update.

FIG. 4 is a diagram which shows an example of the updated emergency braking map 152. For example, when the vehicle speed is 60 km/h and the deceleration is 0.5 m/s$^2$, the requested torque is updated from "A-1" to "A-2." Although the requested torque at all vehicle speeds and decelerations is updated in the emergency braking map 152 shown in FIG. 4, the emergency braking map 152 may be updated for some of the vehicle speeds and decelerations. The map updater 124 may, for example, update the requested torque for a vehicle speed or a deceleration for which it is determined that the true value is not certain. In this manner, the driving support device 100 ends the processing shown in FIG. 3.

The driving support device 100 of the embodiment updates the emergency braking map 152 on the basis of the true values obtained when the cruise control is executed. For this reason, the emergency braking map 152 used at the time of the emergency braking control, which is executed less frequently, is updated with data obtained when the cruise control, which is executed more frequently than the emergency braking control, is executed. Therefore, for example, even if the braking performance deteriorates due to wear of a brake pad of the brake device 300, or the like, it is possible to control braking appropriately by taking measures such as increasing a control amount for the emergency braking control. Moreover, even if the braking performance is improved by replacing the worn brake pad, it is possible to control braking appropriately by, for example, reducing the control amount.

Moreover, in the embodiment described above, the emergency braking map 152 is updated on the basis of the estimated true value, but the cruise control braking map may also be updated together. In the embodiment described above, the deceleration setter 110, the deceleration torque calculator 120, and the braking controller 130 are collectively provided inside the driving support device 100, but these elements may be dispersed in different devices.

For example, the cruise controller 112 in the deceleration setter 110 may be provided as a part of a cruise control device that performs both deceleration and acceleration. In addition, the deceleration torque calculator 120 may be provided in an integrated management unit (IMG), and the braking controller 130 may be provided in the electric servo brake system (ESB) or a vehicle stability assist (VSA).

The embodiment described above can be expressed as follows.

A driving support device is configured to include a storage device that has stored a program, and a hardware processor, in which the hardware processor executes the program stored in the storage device, thereby calculating a first braking control amount of braking control, calculating, on the basis of a setting standard, a second braking control amount of the braking control executed at a lower execution frequency than an execution frequency of the braking control based on the first braking control amount, updating the setting standard on the basis of a relative relationship between an estimated braking behavior based on the first braking control amount and an actual braking behavior based on the first braking control amount, and executing the braking control.

In addition, the embodiment described above can also be expressed as follows.
[Appendix 1]
A driving support device includes a processor configured to control braking of a vehicle, in which the processor calculates a first braking control amount that is a control amount when the braking of a vehicle is controlled, controls the braking of a vehicle at a first frequency on the basis of the first braking control amount, calculates, on the basis of a setting standard, a second braking control amount that is a control amount when the braking of a vehicle is controlled, controls the braking of a vehicle at a second frequency lower than the first frequency on the basis of the second braking control amount, and updates the setting standard on the basis of a relative relationship between a first behavior that is estimated to occur in the vehicle when the braking is controlled on the basis of the first braking control amount and a second behavior that actually occurs in the vehicle when the braking is controlled on the basis of the second braking control amount.
[Appendix 2]
The processor may calculate a control amount of the braking when a speed of the vehicle is controlled according to a preset vehicle speed as the first braking control amount, and calculate a control amount of the braking when a speed of the vehicle is controlled to avoid a collision between the vehicle and an obstacle as the second braking control amount.
[Appendix 3]
The setting standard may be a map in which braking control amount which can be obtained as the second braking control amount, is associated with a vehicle speed and a deceleration when a speed of the vehicle is controlled to avoid the collision.
[Appendix 4]
The processor may update the setting standard on the basis of a plurality of relative relationships.
[Appendix 5]
The processor may exclude target data whose difference from other data exceeds a threshold value among data representing each of the plurality of relative relationships from the data representing each of the plurality of relative relationships.
[Appendix 6]
A driving support method includes, by a computer, controlling braking of a vehicle, calculating a first braking control amount that is a control amount when the braking of the vehicle is controlled, controlling the braking of the vehicle at a first frequency on the basis of the first braking control amount, calculating a second braking control amount that is a control amount when the braking of the vehicle is controlled on the basis of a setting standard, controlling the braking of the vehicle at a second frequency lower than the first frequency on the basis of the second braking control amount, and updating the setting standard on the basis of a relative relationship between a first behavior that is estimated to occur in the vehicle when the braking is controlled on the basis of the first braking control amount and a second behavior that actually occurs in the vehicle when the braking is controlled on the basis of the second braking control amount.
[Appendix 7]
A computer-readable non-transitory storage medium that has stored a program causing a computer to execute controlling braking of a vehicle, calculating a first braking control amount that is a control amount when the braking of the vehicle is controlled, controlling the braking of the vehicle at a first frequency on the basis of the first braking control amount, calculating a second braking control amount that is a control amount when the braking of the vehicle is controlled on the basis of a setting standard, controlling the braking of the vehicle at a second frequency lower than the first frequency on the basis of the second braking control amount, and updating the setting standard on the basis of a relative relationship between a first behavior that is estimated to occur in the vehicle when the braking is controlled on the basis of the first braking control amount and a second behavior that actually occurs in the vehicle when the braking is controlled on the basis of the second braking control amount.

Although a form for implementing the present invention has been described above using the embodiment, the present invention is not limited to the embodiment, and various modifications and substitutions can be made within a range not departing from the gist of the present invention.

What is claimed is:
1. A driving support device comprising:
a braking controller configured to execute braking control;

a first calculator configured to calculate a first braking control amount of the braking controller;

a second calculator configured to calculate, on the basis of a setting standard, a second braking control amount of the braking control executed at an execution frequency lower than an execution frequency of the braking control based on the first braking control amount; and an updater configured to update the setting standard on the basis of a relative relationship between an estimated braking behavior based on the first braking control amount and an actual braking behavior based on the first braking control amount, wherein the first calculator calculates the first braking control amount when vehicle speed control according to a set vehicle speed is executed, and the second calculator calculates the second braking control amount when emergency braking control is executed.

2. The driving support device according to claim 1, wherein the updater updates the setting standard on the basis of a plurality of relative relationships between the estimated braking behavior and the actual braking behavior.

3. The driving support device according to claim 2, wherein, when target data is data whose difference from other data exceeds a predetermined threshold value among data of the plurality of relative relationships, the target data is excluded from the data of the plurality of relative relationships.

4. The driving support device according to claim 1, wherein the setting standard is a braking map that includes a braking control amount according to a vehicle speed and a deceleration when the emergency braking control is executed.

5. A driving support method comprising:

by a computer, calculating a first braking control amount of braking control;

calculating, on the basis of a setting standard, a second braking control amount of the braking control executed at an execution frequency lower than an execution frequency of the braking control based on the first braking control amount;

updating the setting standard on the basis of a relative relationship between an estimated braking behavior based on the first braking control amount and an actual braking behavior based on the first braking control amount;

executing the braking control;

calculating the first braking control amount when vehicle speed control according to a set vehicle speed is executed; and calculating the second braking control amount when emergency braking control is executed.

6. A computer-readable non-transitory storage medium that has stored a program causing a computer to execute:

calculating a first braking control amount of braking control;

calculating, on the basis of a setting standard, a second braking control amount of the braking control executed at an execution frequency lower than an execution frequency of the braking control based on the first braking control amount;

updating the setting standard on the basis of a relative relationship between an estimated braking behavior based on the first braking control amount and an actual braking behavior based on the first braking control amount;

executing the braking control;

calculating the first braking control amount when vehicle speed control according to a set vehicle speed is executed; and calculating the second braking control amount when emergency braking control is executed.

\* \* \* \* \*